United States Patent
Reaves et al.

(10) Patent No.: US 9,821,831 B2
(45) Date of Patent: Nov. 21, 2017

(54) STROLLER AND ACCESSORY DEVICE FOR SAME HAVING INTEGRATED MOUNTS FOR AN INFANT CAR SEAT

(71) Applicant: Graco Children's Products Inc., Atlanta, GA (US)

(72) Inventors: Nick Reaves, Atlanta, GA (US); Jessica Tebbe, Alpharetta, GA (US); Stephen Jones, Atlanta, GA (US); Craig Cochran, Atlanta, GA (US); Jeff Juskowich, Atlanta, GA (US); Maureen Carroll, Atlanta, GA (US); Ellen Brown, Atlanta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 15/111,717
(22) PCT Filed: Jan. 15, 2015
(86) PCT No.: PCT/US2015/011618
§ 371 (c)(1),
(2) Date: Jul. 14, 2016
(87) PCT Pub. No.: WO2015/109103
PCT Pub. Date: Jul. 23, 2015

(65) Prior Publication Data
US 2016/0332655 A1 Nov. 17, 2016

Related U.S. Application Data

(60) Provisional application No. 61/927,967, filed on Jan. 15, 2014.

(51) Int. Cl.
*B62B 7/14* (2006.01)
(52) U.S. Cl.
CPC ............. *B62B 7/142* (2013.01); *B62B 7/145* (2013.01)

(58) Field of Classification Search
CPC .......... B62B 7/142; B62B 7/145; B62B 9/10; B62B 9/102; B62B 9/12; B62B 9/28
See application file for complete search history.

(56) References Cited

U.S. PATENT DOCUMENTS

| | | | |
|---|---|---|---|
| 5,794,951 A | 8/1998 | Corley et al. | |
| 2010/0140902 A1 | 6/2010 | Zehfuss | |
| 2015/0042056 A1* | 2/2015 | Sparling | B62B 9/12 280/47.35 |

FOREIGN PATENT DOCUMENTS

| | | |
|---|---|---|
| CN | 202987242 U | 6/2013 |
| WO | 2007033562 A1 | 3/2007 |

OTHER PUBLICATIONS

International Search Report for Application No. PCT/US15/11618 dated Apr. 21, 2015, pp. 1-7.
Written Opinion for Application No. PCT/US15/11618 dated Apr. 21, 2015, pp. 1-4.

* cited by examiner

*Primary Examiner* — Erez Gurari
(74) *Attorney, Agent, or Firm* — Eversheds Sutherland (US) LLP

(57) ABSTRACT

An accessory device (20) for a stroller has a body (42) with a central portion (44) between opposed free ends (46) of the body and has an infant car seat mount (120) carried on the body (42) near at least one of the free ends of the body (42). The accessory device (20) is configured to at least partially widthwise traverse a frame assembly of a stroller (10) when installed on the frame assembly. The accessory device (20) is selectively removable from and attachable to the frame assembly, whereby the infant car seat mount (120) is also removable from and attachable relative to the frame assembly in concert with the accessory device.

18 Claims, 10 Drawing Sheets

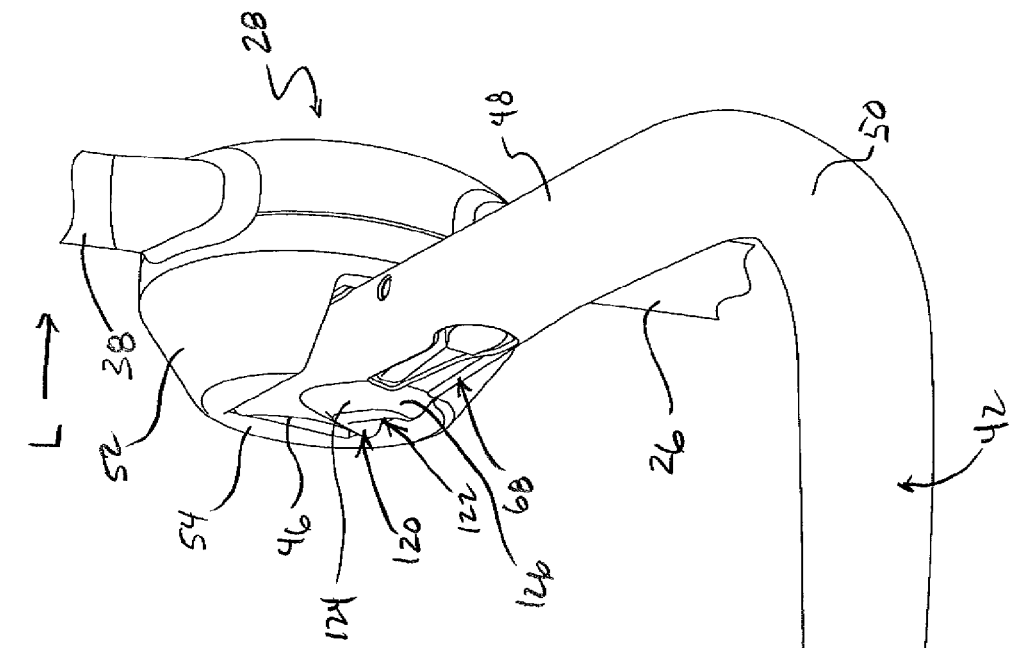
FIG. 3
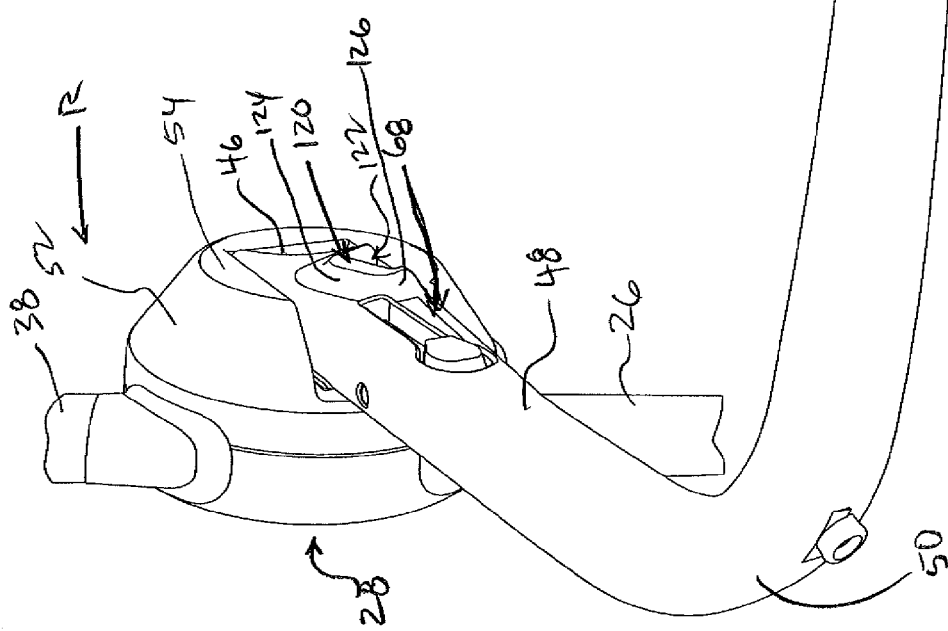

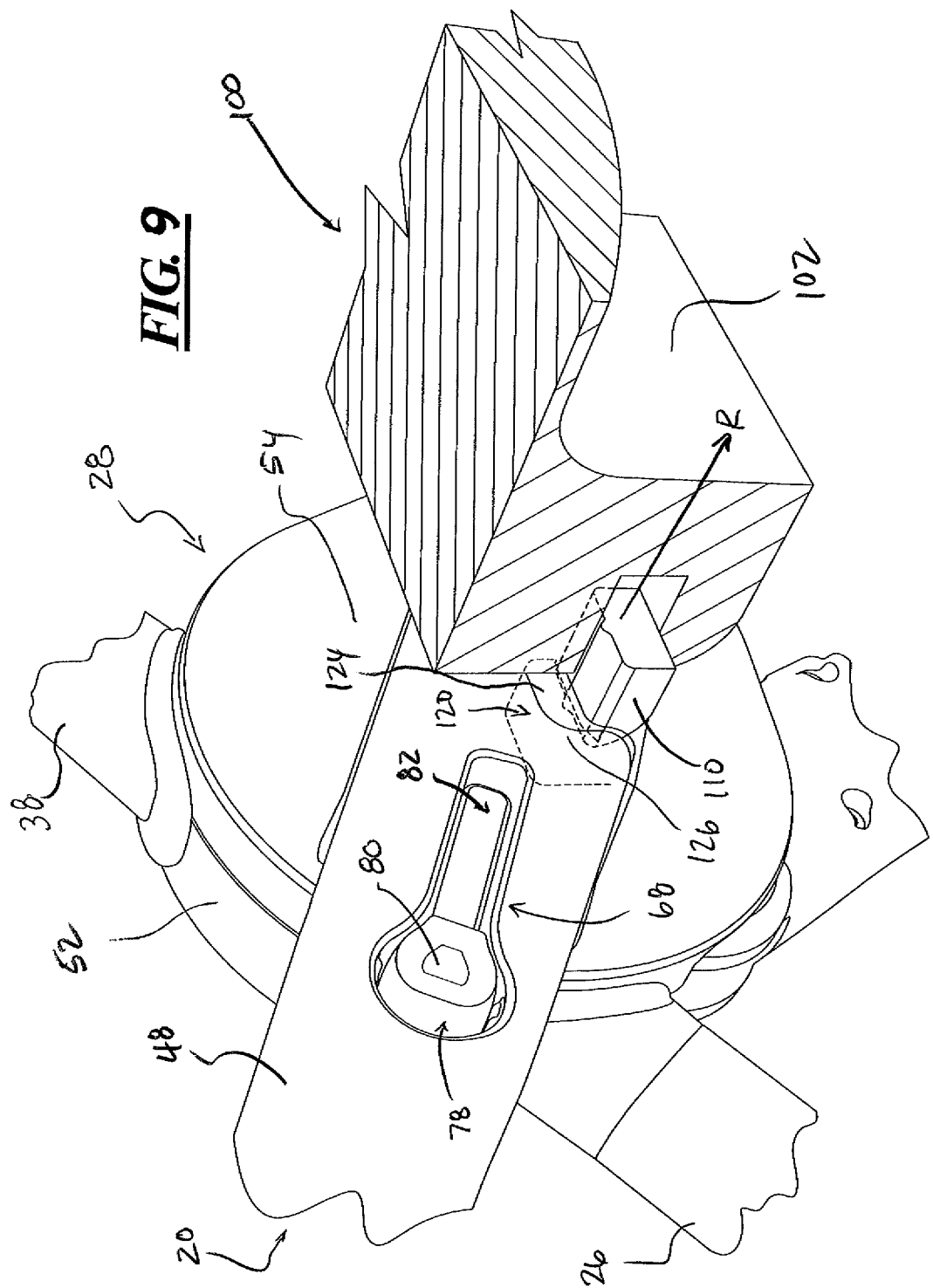

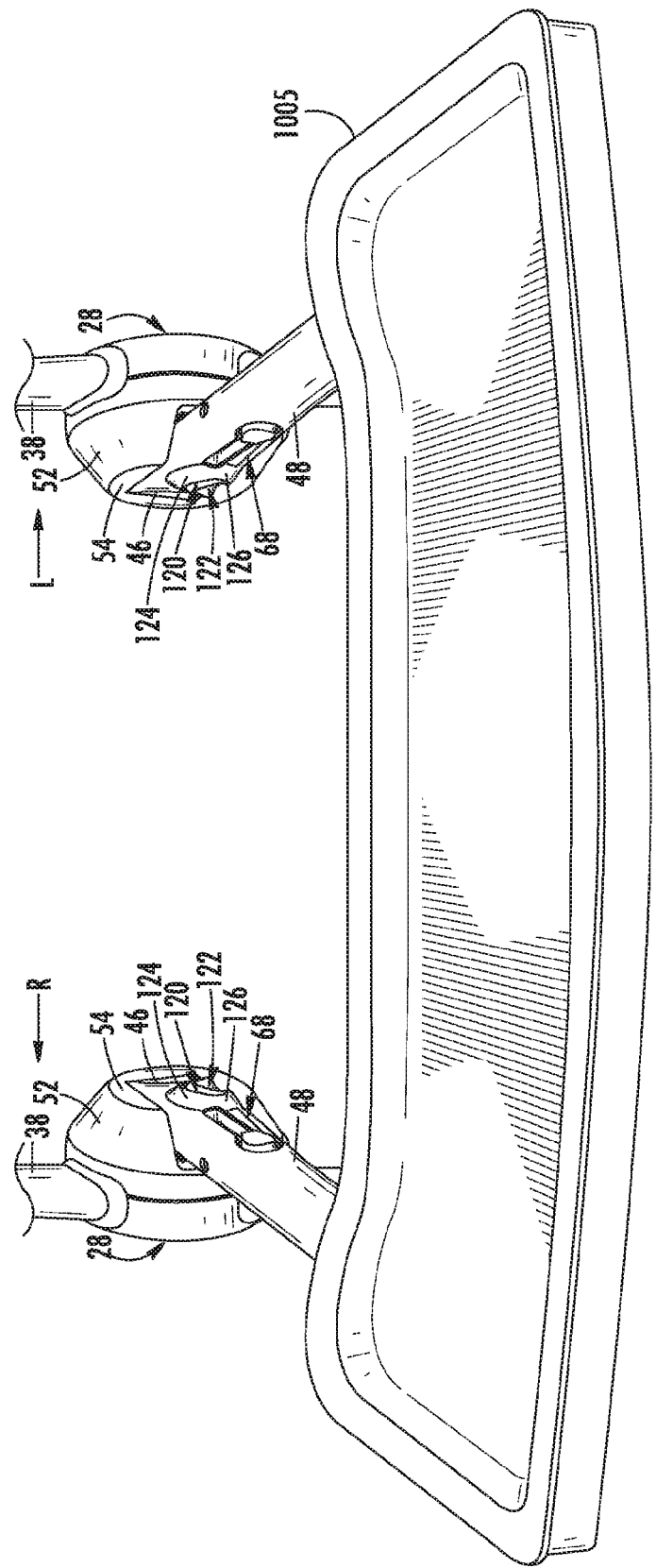

STROLLER AND ACCESSORY DEVICE FOR SAME HAVING INTEGRATED MOUNTS FOR AN INFANT CAR SEAT

RELATED APPLICATION DATA

This patent is related to and claims priority benefit of U.S. provisional application Ser. No. 61/927,967 filed on Jan. 15, 2014 and entitled "Stroller and Arm Bar for Same Having Integrated Mounts for an Infant Car Seat." The entire contents of this prior filed provisional application are hereby incorporated herein by reference.

BACKGROUND

1. Field of the Disclosure

The present disclosure is generally directed to strollers and stroller travel systems, and more particularly to a stroller having a removable accessory device that carries integrated mounts for attaching an infant car seat to the stroller.

2. Description of Related Art

It is known in the art to provide a stroller and an infant carrier or infant car seat (ICS) as a part of a travel system. Such a prior art travel system includes an infant carrier and a stroller as well as an ICS base. The ICS base is provided for optionally installing the infant carrier on a vehicle seat within a vehicle as a part of the travel system. This type of infant carrier can also optionally be removably attached to the stroller as a part of the travel system. The stroller typically has ICS mounts that are integrated on a part of the stroller. The ICS mounts are typically provided as permanent parts of the stroller frame, the fold joints, or the like. The ICS mounts therefore remain attached at all times to the stroller.

The infant carrier of such a travel system typically has connectors or latches of some type that engage the ICS mounts to secure the infant carrier to the stroller. In one example, an infant carrier can have retractable bosses or latch connectors on the sides of the seat shell. The bosses may be spring loaded to resiliently protrude from the sides of the shell. The infant carrier can be lowered onto the stroller, whereby the bosses will be forced inward against the spring bias until snapping or firing into the ICS mounts on the stroller frame. The bosses and ICS mounts assist in securing the infant carrier in place on the stroller. Such an infant carrier is provided with a release actuator or handle that, when actuated, can retract the bosses and disengage them from the ICS mounts. This permits removal of the infant carrier from the stroller when desired.

When not mounted on the stroller, the infant carrier of such a travel system can function as a conventional infant carrier. When a caregiver attaches the infant carrier to the stroller, the carrier typically sits atop the stroller frame above the toddler seat on the stroller. One end of the infant carrier of a travel system may rest on the stroller arm bar or toddler tray that traverses the stroller frame in front of and above the toddler seat. The arm bar or tray can thus provide additional support and stability to the infant carrier when installed on the stroller. On some strollers, the arm bar or tray may be removable. Because the ICS mounts are provided as a permanent part of existing strollers, a caregiver may incorrectly install the infant carrier of the travel system on the stroller while the arm bar or tray is detached. This can result in the infant carrier being mounted to the stroller in an unstable manner.

SUMMARY

In one example according to the teachings of the present disclosure, an accessory device for a stroller has a body with a central portion between opposed free ends of the body and has an infant car seat mount carried on the body near at least one of the free ends of the body. The accessory device can be configured to widthwise traverse or at least partly widthwise traverse a frame assembly of a stroller when installed on the frame assembly. The accessory device is selectively removable from and attachable to the frame assembly. The infant car seat mount is thereby also removable from and attachable relative to the frame assembly along with the accessory device.

In one example, the accessory device can be an arm bar selectively removable from and attachable to the frame assembly.

In one example, the accessory device can be a child tray selectively removable from and attachable to the frame assembly.

In one example, the accessory device can have a latch element provided near at least one free end of the body. The latch element can be configured to selectively engage with or disengage from a part of a stroller or the frame assembly of the stroller.

In one example, the accessory device can include a latch element provided near each free end of the body. Each of the latch elements can be configured to selectively engage with or disengage from a part of a stroller or the frame assembly of a stroller.

In one example, the at least one infant car seat mount further includes an infant car seat mount carried near each of the free ends of the body.

In one example according to the teachings of the present disclosure, a stroller has a frame assembly and an accessory device. The accessory device has a body with a central portion between opposed free ends of the body and has an infant car seat mount carried on the body near at least one of the free ends of the body. The accessory device is selectively removable from and attachable to the frame assembly, whereby the infant car seat mount is also removable from and attachable relative to the frame assembly along with the accessory device.

In one example, the accessory device can be an arm bar or a child tray selectively removable from and attachable to the frame assembly.

In one example, the stroller can include a latch element provided near at least one free end of the body of the accessory device. The latch element can be configured to selectively engage with or disengage from a part of the stroller or the frame assembly of the stroller.

In one example, the stroller can have a latch element provided near each free end of the body. Each of the latch elements can be configured to selectively engage with or disengage from a part of the stroller or the frame assembly of the stroller.

In one example, the stroller can include one or more latch elements configured to selectively engage with or disengage from a part of the stroller of the frame assembly of the stroller. Each of the one or more latch elements can include a toggle lever with a latch at a first end and a push lever at a second end opposite the latch. Each latch can engage with a respective latch receiver on the frame assembly or the stroller when the accessory device is attached to the frame assembly. Each push lever can be actuable to disengage the corresponding latch from the respective latch receiver permitting removal of the accessory device from the frame assembly.

In one example, the infant car seat mount can be formed as a contiguous integrated part of the accessory device and can be an upwardly open receiver thereon.

In one example, the frame assembly can have spaced apart frame sides. An infant car seat mount can be carried near each of the free ends of the body, one adjacent each of the frame sides of the frame assembly.

In one example according to the teachings of the present disclosure, a travel system can include i) a stroller having a frame assembly with left and right frame sides, ii) an infant carrier having a seat shell, a release handle, and a plurality of latch connectors exposed beyond the seat shell and operable by the release handle, and iii) an accessory device having a body with a central portion between opposed free ends of the body, an infant car seat mount carried on the body near each of the free ends of the body, and a latch element near each free end of the body. The latch elements respectively engage with parts on the left and right frame sides when the accessory device is attached to the stroller. When the accessory device is attached to the stroller and the infant carrier is installed on the stroller, a portion of the shell can be configured to rest on the accessory device and one of the plurality of latch connectors engage each of the infant car seat mounts. When the infant carrier is removed from the stroller, the accessory device is removable from the stroller by actuating the latch elements, whereby the infant car seat mounts are also removable from the frame assembly along with the accessory device.

BRIEF DESCRIPTION OF THE DRAWINGS

Objects, features, and advantages of the present invention will become apparent upon reading the following description in conjunction with the drawing figures, in which:

FIG. 3 shows a close up view of the accessory device and stroller frame assembly of FIG. 2.

FIG. 9 shows a partial cut-away view of one side of the infant carrier of FIG. 8 and depicting a side latch on the carrier engaged with an ICS mount on the accessory device.

FIG. 10 shows a close up view of an accessory device including a child tray and the stroller frame assembly of FIG. 2.

DETAILED DESCRIPTION OF THE DISCLOSURE

The disclosed accessory device, stroller, and travel system solve or improve upon one or more of the above-noted and/or other problems and disadvantages with prior known strollers and travel systems. The disclosed accessory device can be an arm bar or child tray, or other such device, which carries the ICS mounts instead of the stroller. The disclosed accessory device has ICS mounts that are integrated into one or each end of the device. When the disclosed accessory device is attached to the stroller, the ICS mounts are only then attached and properly positioned on the stroller to accept an infant carrier. When the disclosed accessory device is detached from the stroller, the ICS mounts are also detached. Thus, the infant carrier cannot be properly secured on the stroller unless the accessory device is attached to the stroller. The disclosed accessory device can be an arm or can be replaced by a child tray of the stroller, whereby the child tray would also carry such integrated ICS mounts. These and other objects, features, and advantages of the present disclosure will become apparent to those having ordinary skill in the art upon reading this disclosure.

Prior art travel systems are discussed above where the ICS mounts are carried permanently on the stroller frame or frame fold joints. In the disclosed example of a travel system, the ICS mounts for an infant carrier are provided on a removable accessory device for the stroller. The ICS mounts do not remain in place on the stroller if the accessory device is not properly installed. Thus, a caregiver will have great difficulty in installing an infant carrier on the stroller if the accessory device, which helps to support the carrier, is not installed. There would simply be no ICS mounts present to attach to the carrier if no supporting device is installed.

Figure 1:
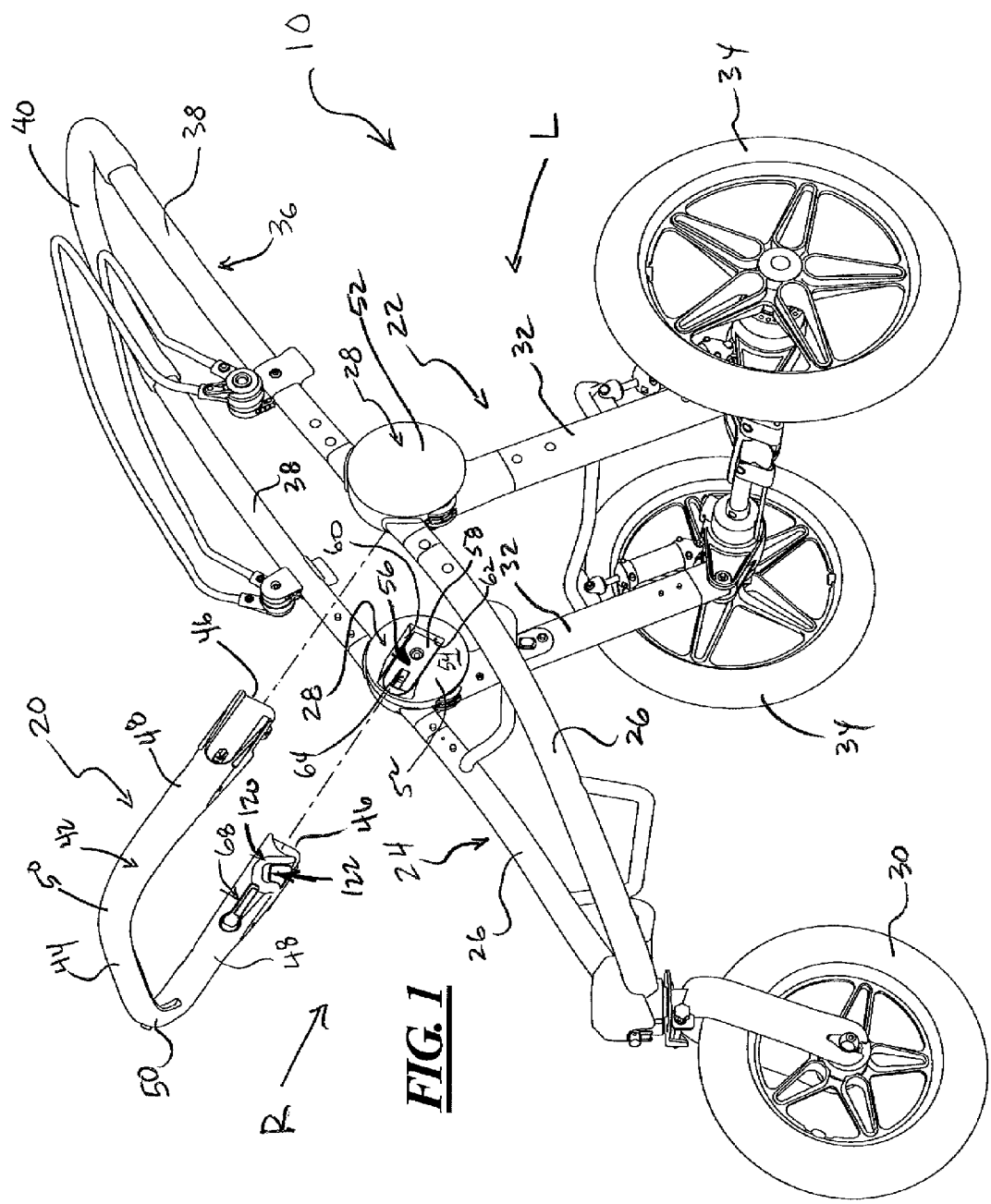
FIG. 1 shows a side perspective view of a stroller frame assembly with an accessory device constructed in accordance with the teachings of the present disclosure, the accessory device shown detached therefrom.
Figure 2:
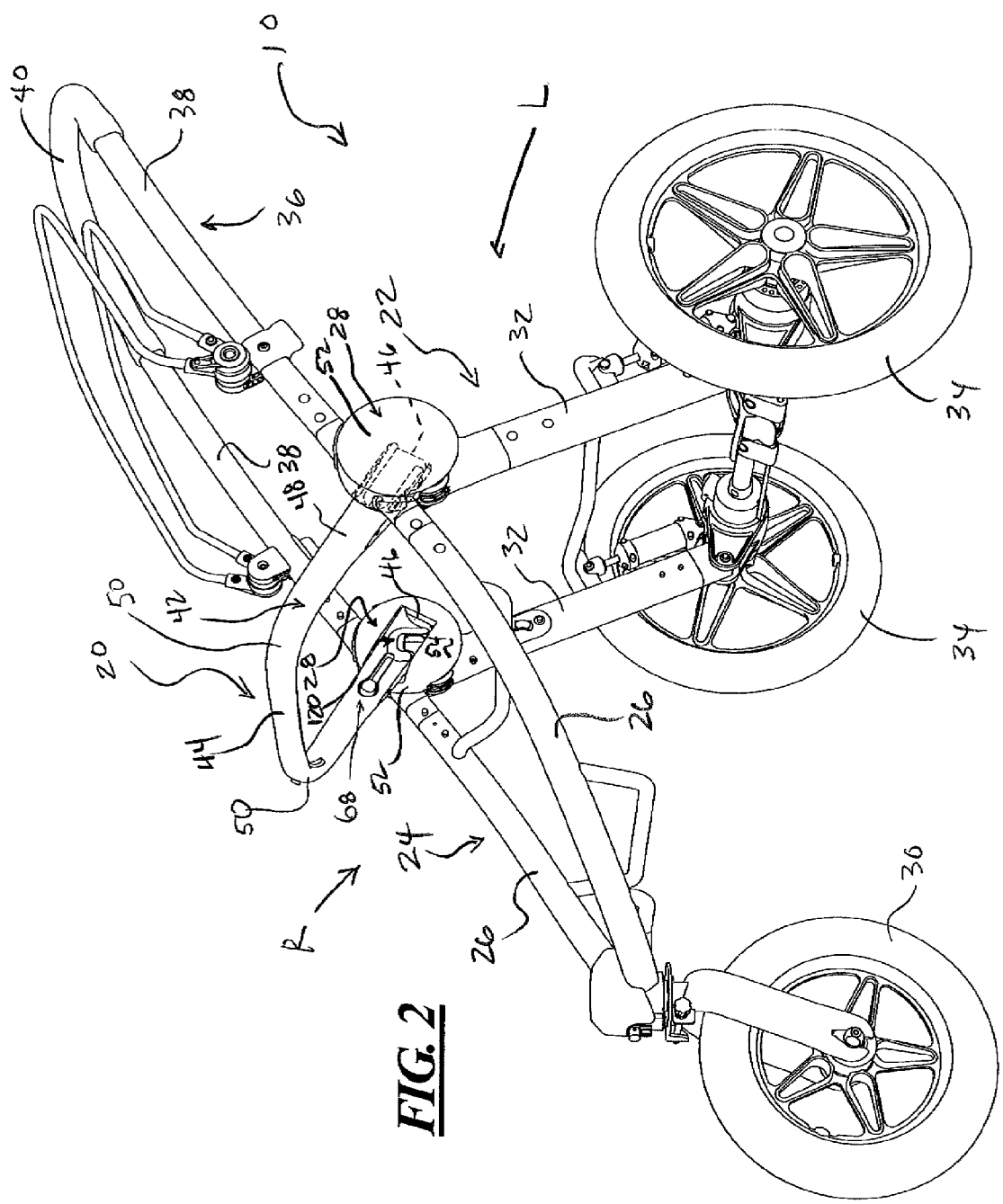
FIG. 2 shows the stroller frame assembly with the accessory device attached thereto.

Turning now to the drawings, FIGS. 1 and 2 illustrate one example of a stroller 10 constructed in accordance with the teachings of the present disclosure. In this example, the stroller 10 has a removable accessory device that attaches to part of the stroller. For this description, the accessory device is an arm bar 20 that provides an arm rest to a toddler seat occupant of the stroller. The arm bar can also provide a barrier to help discourage the seat occupant from inadvertently exiting the seat. In other examples, the accessory device can be a child tray 1005, as shown in FIG. 10, or some other device. A child tray 1005 is known to provide a surface on which a caregiver or seat occupant can place objects such as food, drinks, toys, or the like. Though the arm bar 20 is referenced in this detailed description and shown in the drawings, it should be understood that the accessory device can take on other forms as well.

The stroller 10 in this example is a three wheeled jogger style stroller. The stroller 10 generally has a frame assembly 22 with a left frame side L and a right frame side R. The frame assembly 22 includes a front leg assembly 24 with left and right front legs 26 that extend forward and downward from a central fold joint 28 on each frame side L and R. A single front wheel 30 is carried at the distal ends of the front legs 26. The frame assembly 22 also has left and right rear legs 32, one each depending from the respective one of the fold joints 28. A rear wheel 34 is carried at the bottom end of each rear leg 32. The frame assembly 22 also has a handle assembly 36 with left and right push arms 38 and a handle bar 40 extending laterally across the frame assembly and connecting the free ends of the push arms 38. Such a stroller 10 would also have a toddler seat suspended from or supported by the frame assembly 22. However, no such seat is shown or described herein for ease of illustration and description.

The stroller 10 can vary considerably in configuration and construction from the example shown and described herein. For example, the stroller can be a conventional four-post style or four-wheel stroller, if desired. The stroller can have different frame assembly components and have a different overall shape and configuration, if desired. The stroller can also have numerous other features, options, and accessories that have no significant bearing on the invention disclosed herein. The stroller can also have different fold movements, configurations, and arrangements. As will become apparent to those having ordinary skill in the art upon reading this disclosure, the specific stroller or frame assembly design is not intended to limit the scope of the invention or the appended claims.

Figure 4:
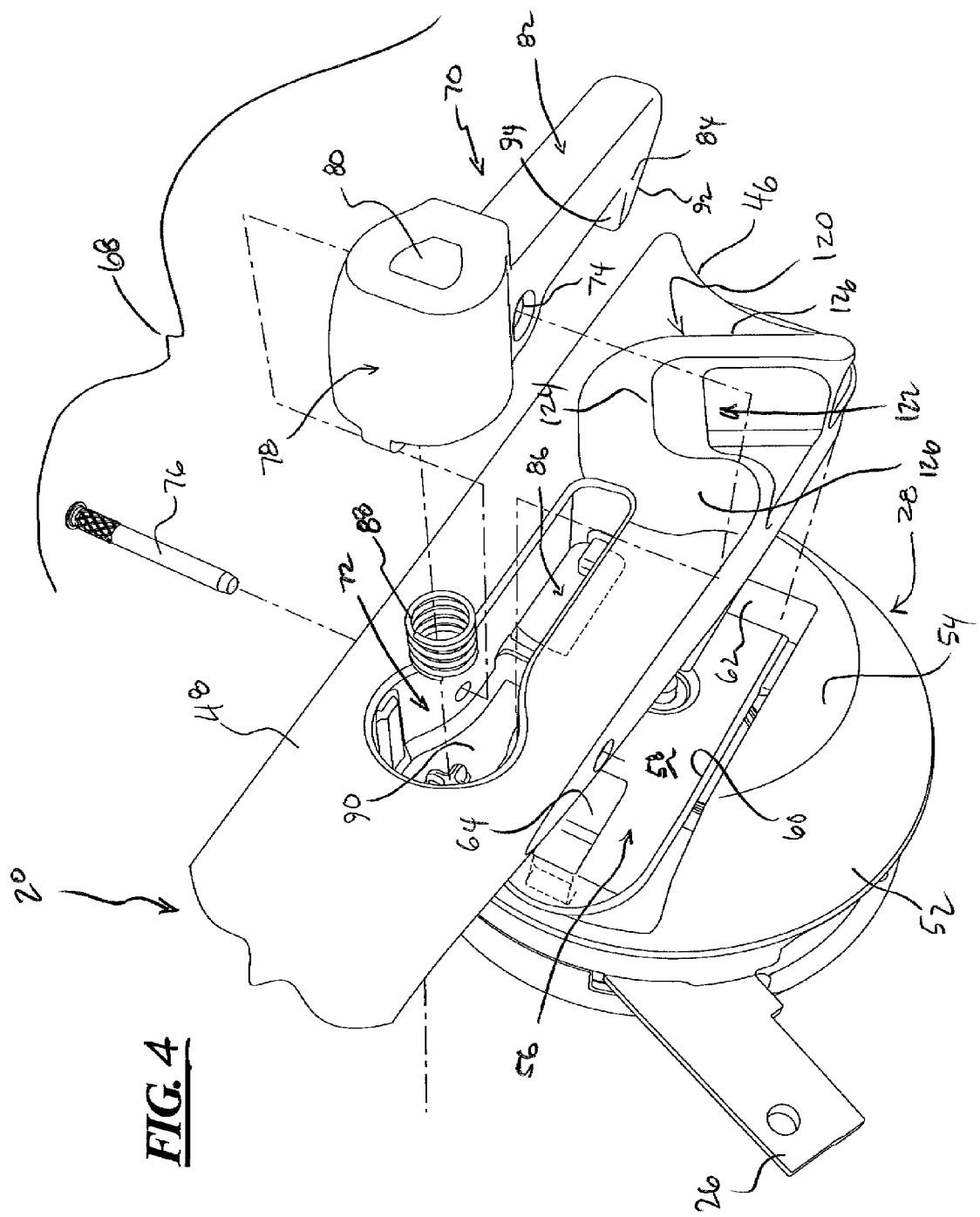
FIG. 4 shows an exploded view of part of the accessory device and stroller frame assembly of FIG. 1.

FIG. 1 shows the arm bar 20 detached from the stroller 10. FIG. 2 shows the arm bar 20 attached to the stroller 10. The arm bar 20 is thus intended to be detachable from and attachable to the stroller 10 by a caregiver. The arm bar 20 can be attachable to any suitable part of the stroller 10, such as a frame component on one or both of the frame sides L and R or to one or both of the fold joints 28, as in the disclosed example. FIGS. 3 and 4 show more detailed views of the arm bar 20, which is one example of an accessory device constructed in accordance with the teachings of the present disclosure. FIGS. 3 and 4 also show more detailed views of the part of the stroller, i.e., the fold joints 28, which are positioned and configured to receive the arm bar.

In this example, the arm bar 20 has a C- or U-shaped structure or body 42. The body 42 has a central portion 44 between two opposed ends 46. In this example, the central portion 44 of the body 42 extends across or widthwise traverses the width of the frame assembly between the left and right frame sides L, R. The body 42 also has two arms 48 that are joined to the central portion 44 at bends or joints 50. The arms 48 in this example extend rearward from the central portion 44 at the bends 50, when attached to the stroller 10, and in this example are generally perpendicular to the central portion. The arms 48 have free ends opposite the bends that form the ends 46 of the body 42. The overall shape and configuration of the arm bar 20 can vary from the example shown and described herein as well. The arm bar 20 can be a continuous curved shape, if desired, or can have a more complicated curved structure. The disclosed invention and the appended claims are not intended to be limited by the particular example disclosed.

Each arm 48 of the disclosed arm bar 20 performs at least two separate functions and has components thereon for performing same. The first function is to removably attach the arm bar 20 to the stroller 10 and the second function is to provide ICS mounts for attaching an infant carrier to the stroller. The components and functions are described with reference to FIGS. 1, 3 and 4. Also in the disclosed example, each frame side L, R and each arm 48 are essentially a mirror image of the other. Thus, only one side will be described in detail below. It should be understood that, at least for the disclosed example, the other side has essentially the same construction.

The fold joint 28 has a housing 52 with an inner face 54 that faces the opposite frame side. A receiver 56 is provided on the inner face and is in the form of a closed end channel. The channel has a bottom surface 58 and side walls 60 that define a width of the channel. An end wall 62 defines the length of the channel and performs a travel stop function as described below. A latch recess 64 is formed into the bottom surface 58 near the front entry of the receiver (opposite the end wall 62 of the channel). The leading end of the latch recess 64 near the channel entry has an undercut creating a catch 66 for the receiver 56.

The arm 48, which is near the free end 46 of the body 42, also has a latch element or mechanism 68 to removably secure the arm to the housing 52 when the arm bar 20 is attached to the stroller 10 in this example. The latch element 68 in this example has a toggle lever 70 seated in a pocket 72 formed in the arm 48. The pocket 72 is shaped to match that of the toggle lever 70, each of which can vary from that shown herein. The toggle lever 70 has a cross-bore 74 defining a pivot axis or fulcrum of the lever. A pivot pin 76 is fitted across the pocket 72 and through the cross-bore 74 of the toggle lever 70. The toggle lever 70 thus can pivot about the pin 76 within the pocket 72.

The toggle lever 70 has a first end, i.e., a push end or actuation end 78 to one side of the cross-bore 74. A button or actuator 80 is formed protruding from the push end 78. The button 80 is user-accessible on the inward facing side of the arm 48 within the pocket 72. The toggle lever 70 also has a second end, i.e., a working end or latch end 82 on the other side of the cross-bore 74 opposite the push end 78. A hook 84 protrudes from the latch end 82 and into the pocket 72. A portion of the pocket 72 has an opening 86 that is open to the other or outward facing side of the arm 48. The opening 86 positionally coincides with the hook 84 so that the hook is exposed on the outward facing side of the arm opposite the pocket 72. A spring 88 is seated against a surface 90 within the pocket adjacent the push end 78 of the toggle lever 70. The spring 88 biases the push end 78 outward, which in turn biases the hook 84 into the pocket 72 and through the opening 86.

FIG. 1 shows the arm bar 20 detached from the stroller 10. In order to attach the arm bar 20 to the stroller 10, a user aligns the arm 48 with the receiver 56 and then slides the arm bar rearward. The arm 48 will slide into the channel of the receiver 56. The hook 84 can have a cam face 92 that is shaped so as to bear against the housing 52 at the channel entry and then slide along the bottom surface 58 of the channel. The cam face 92 will push the hook 84 into the opening 86 to clear the channel bottom surface 58, allowing the arm 48 to slide into the channel. The arm 48 in this example can optionally slide into the receiver 56 only so far as the end wall 62 of the channel. The end wall 62 can act as a travel limiter for the arm 48 into the receiver 56.

Figure 5:
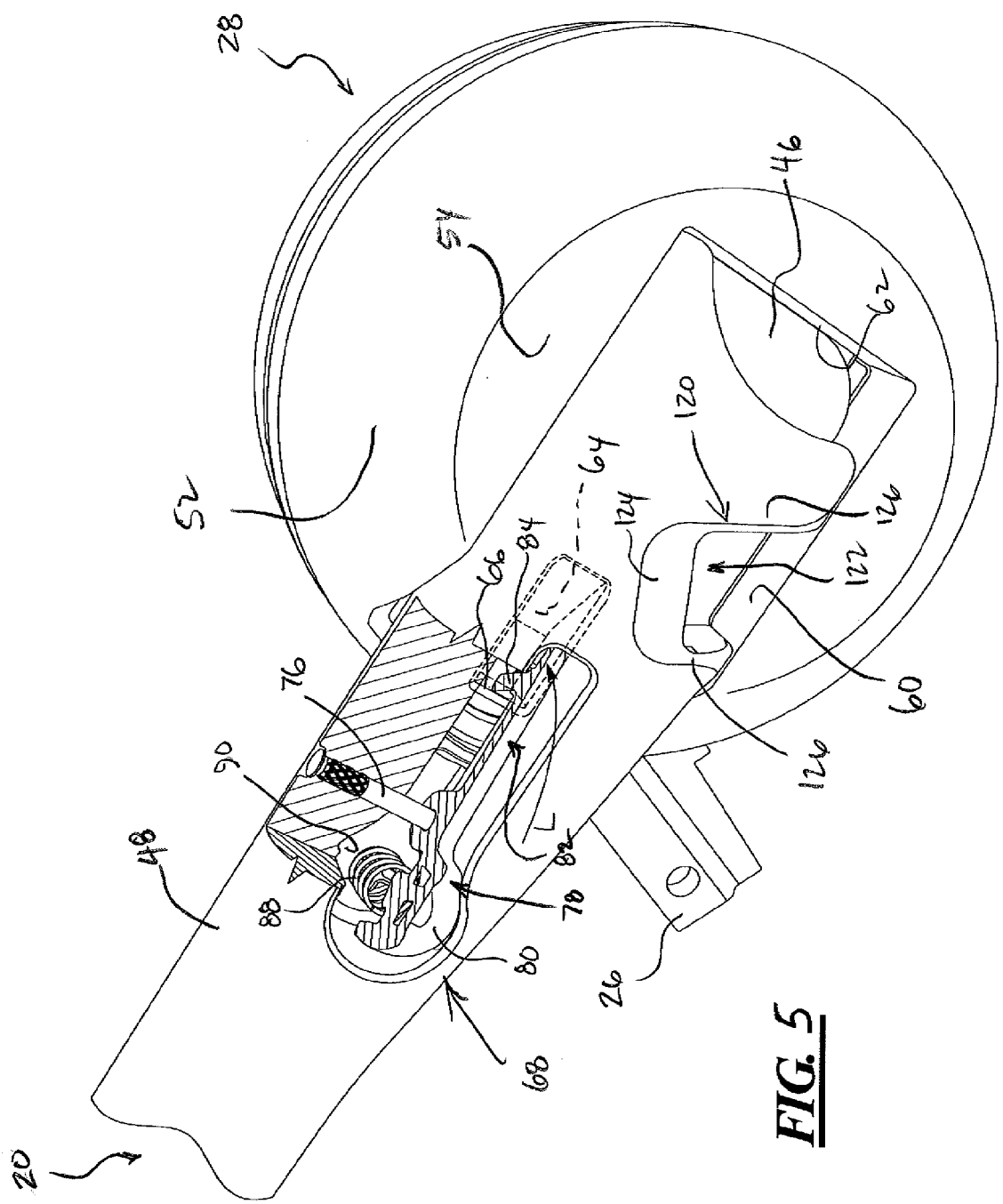
FIG. 5 shows a partial cut-away view of a latch part of the accessory device of FIGS. 1-3 attached to and engaged with part of the stroller frame assembly.
Figure 6:
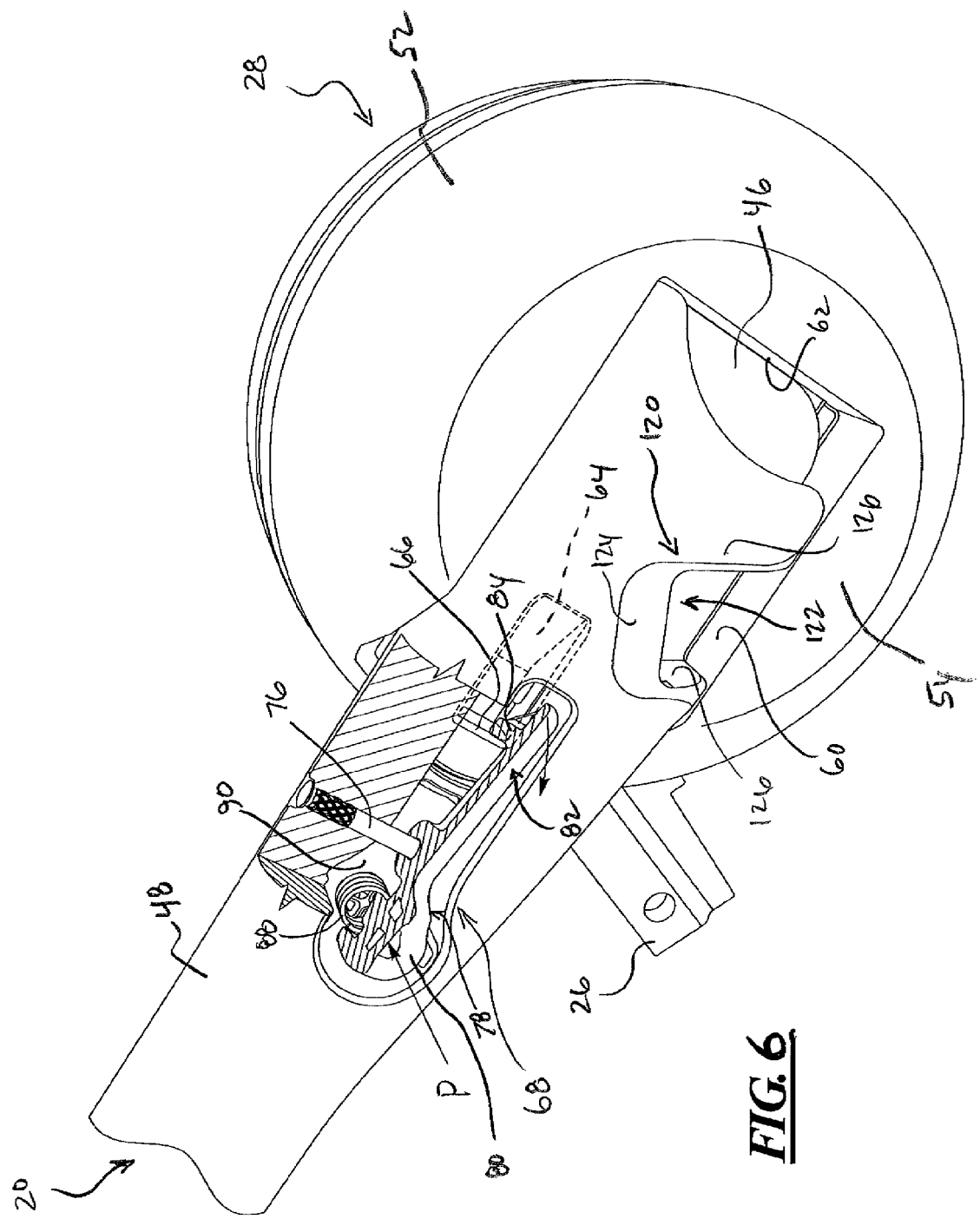
FIG. 6 shows the latch part of the accessory device of FIG. 5, but with the latch part disengaged or released.

When the hook is aligned with the latch recess 64, the spring 88 will toggle the toggle lever 70 about the pin 76, firing the hook into the latch recess. See the arrow L in FIG. 5. The hook 84 can have a hook face 94 configured to hook onto and engage the catch 66 of the latch recess 64. This engagement will retain the arm bar 20 secured to the housing 52. This engaged arrangement is shown in FIG. 5. When a user wishes to detach the arm bar 20 from the stroller 10, the user need only push the button 80 into the pocket 72 in the direction of the arrow P in FIG. 6. This disengages the hook 84 from the catch 66. This disengaged arrangement is depicted in FIG. 6. The arm bar 20 can then be withdrawn from the channel of the receiver 56 and detached from the stroller, as depicted in FIG. 1.

Figure 7:
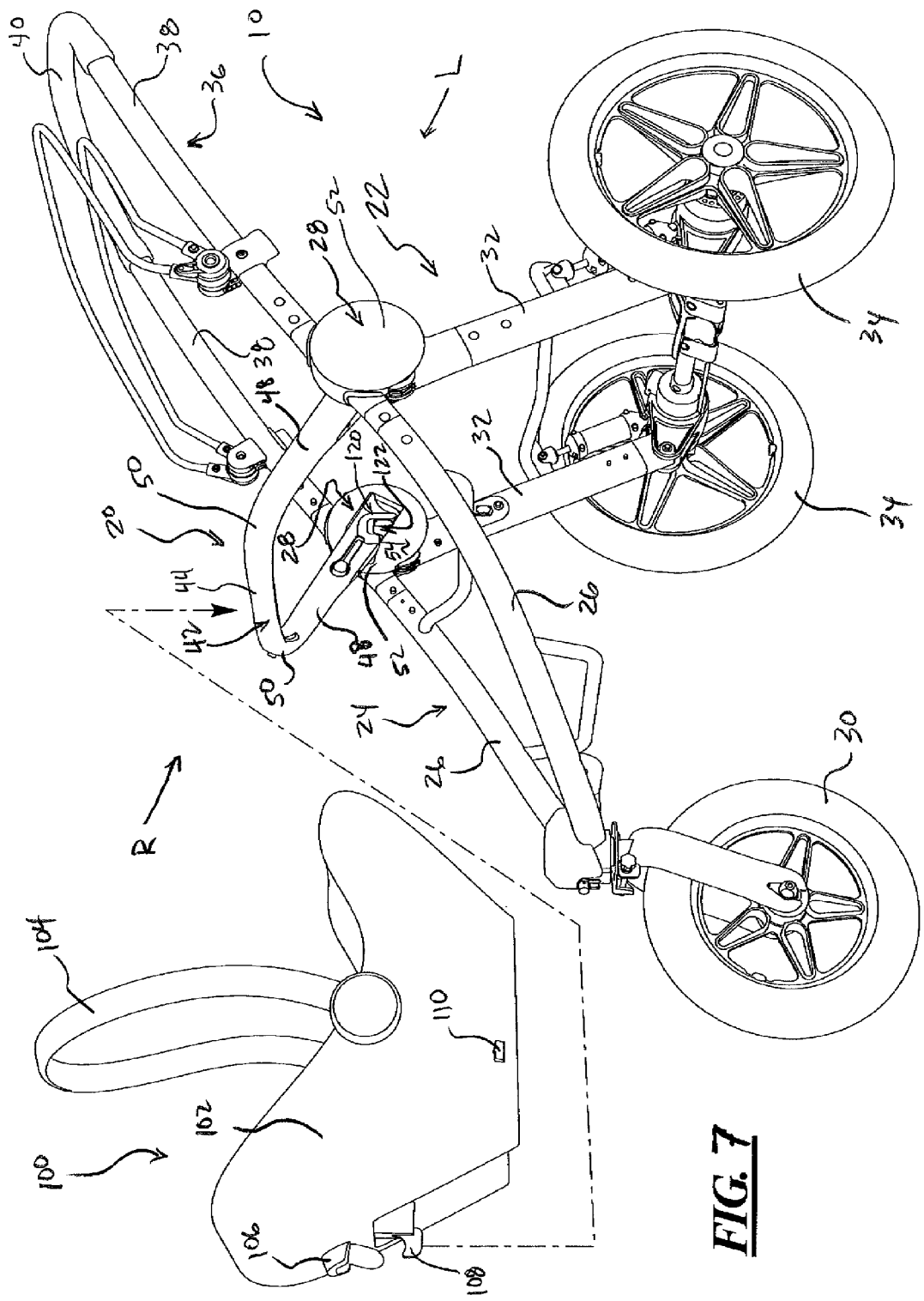
FIG. 7 shows the stroller frame assembly and accessory device of FIG. 2 and an infant carrier prior to being installed on the stroller frame assembly.

FIG. 7 shows part of a travel system according to the teachings of the present disclosure, including the stroller 10 and an infant carrier 100. The second function of the arm bar 20 and the arms 48 is to provide integrated ICS mounts on the arm bar and not the stroller 10 for installing the infant carrier 100 on the stroller. The infant carrier 100 will typically have a seat shell 102 with a carry handle 104 for carrying the infant carrier. The infant carrier 100 can also have a release actuator 106 exposed on a part of the shell, such as on a head end of the shell, as in this example. The release actuator 106 can be operably coupled to a center latch connector 108 that protrudes from the same head end of the shell 102. The infant carrier 100 can also have side latch connectors 110 protruding from each side of the shell 102. The latch connectors 108 and 110 can be spring biased outward from the shell and can be withdrawn simultaneously inward relative to the shell by actuating the release actuator 106, as is known in the art.

The arm 48 in this example also has an ICS mount 120 carried on the inward facing side of the arm. In this example, the ICS mount 120 is integrated as part of the arm bar 20. The ICS mount 120 can be integrally formed as a contiguous part of the arm 48 and from the same material as the arm, if desired. For example, the ICS mount 120 can be integrally molded as a part of the arm 48 on the arm bar 20. Alternatively, the ICS mount 120 can be separately manufactured and fastened, welded, or otherwise fixed or attached to the arm bar so that a user would not be able or inclined to remove the ICS mount from the arm bar. The ICS mount should remain attached to or as part of the arm bar or accessory device.

With reference to FIGS. 1 and 3-5, the ICS mount 120 in this example is a hooded slot or receptacle 122. The receptacle 122 is open facing inward and downward but has closed sides 124 (front and back relative to the stroller 10 as a reference) and a closed top 126. In this example, the receptacle 122 of the ICS mount 120 is provided and structured so as to protrude inward and to open upward in directions that are generally perpendicular to an axis of the arm 48 of the arm bar 20. The ICS mount 120 on the arm 48 in this example generally forms an inverted cup shape with the slot or receptacle 122 within the top 126 and sides 124 of the cup shape. The shape is such that it can mate with the side latch connectors 110 on the infant carrier.

The ICS mounts 120 can vary from the configuration and construction of the disclosed example and yet function as intended. The ICS mounts are intended to engage the side latch connectors 110 on the infant carrier in this example and can be configured to mate with any suitable hook, tab, boss, protrusion, or other such shape and function. The disclosed ICS mounts are not intended to be limited to only the example disclosed and described herein.

Figure 8:
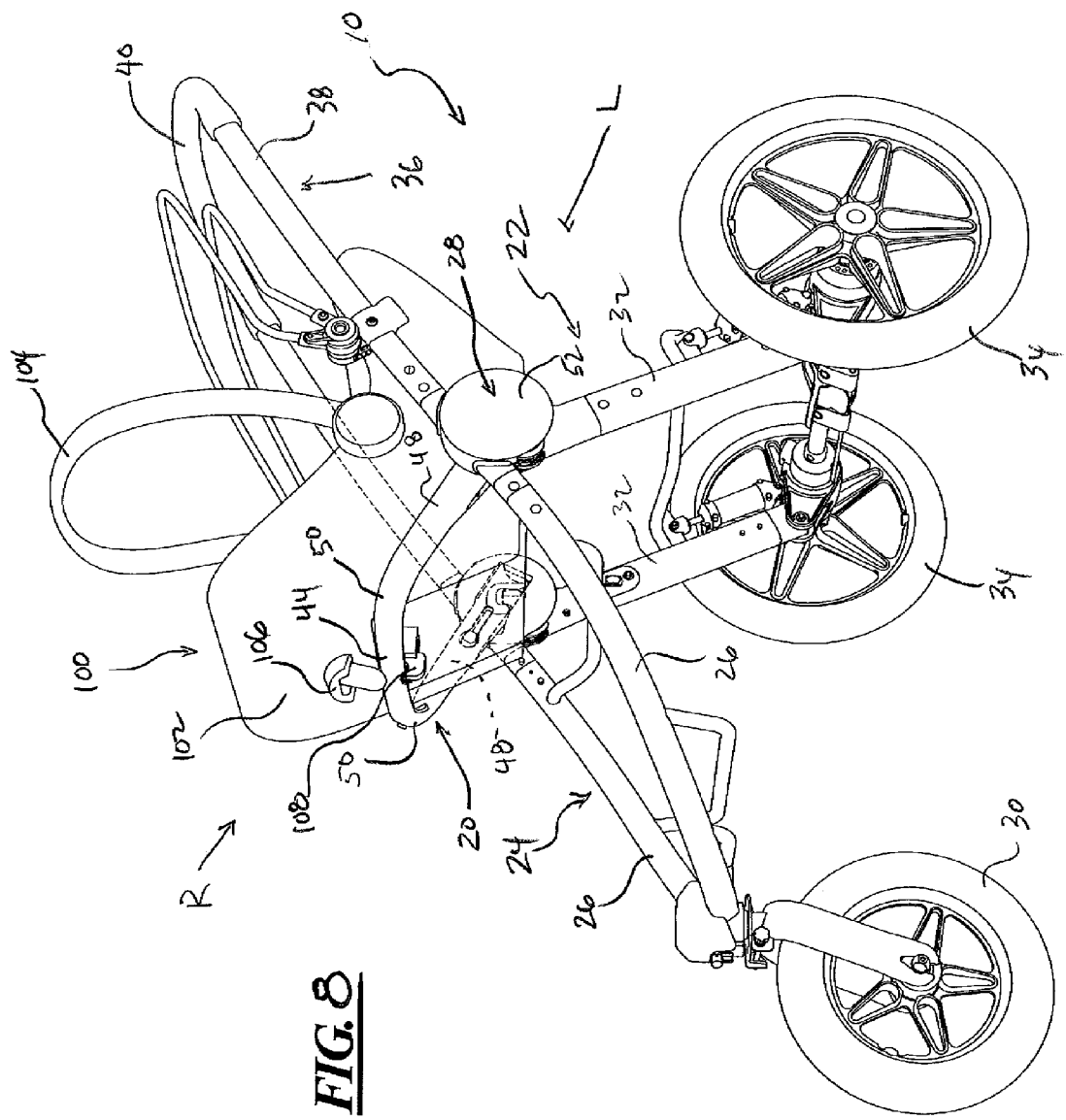
FIG. 8 shows the stroller frame assembly of FIG. 7, but with the infant carrier installed thereon.

To install the infant carrier 100 on the stroller 10 as shown in FIG. 8, the user must first attach the arm bar 20, as described above, and as depicted in FIGS. 2 and 5. Once the accessory device or arm bar 20 is installed, the infant carrier 100 can be placed over the toddler seat (not shown) on the stroller 10 and above the frame assembly 22 and the arm bar 20. The infant carrier 100 can then be lowered onto the arm bar 20 and the ICS mounts 120. The center latch connector 108 can engage and hook onto the central portion 44 of the arm bar 20, as shown in FIG. 8. Likewise, the side latch connectors 110 can engage the ICS mounts 120 and fire into the receptacles 122, as shown in FIG. 9, thus securing the infant carrier 100 to the stroller 10 and/or frame assembly 22. To remove the infant carrier 100 from the stroller 10, the user need only actuate the release actuator 106 to withdraw the latch connectors 108, 110. The infant carrier 100 can then be freely lifted from the stroller frame assembly 22 and arm bar 20.

The design of the center and side latch connectors 108 and 110 can vary. For example, the center latch connector can be an optional feature. Instead, the shell 102 can simply rest on the arm bar 20 if desired and have no center latch at all. In another example, the center latch connector can be a fixed hook that must be first hooked onto the arm bar central portion 44 before lowering the rest of the shell 102 onto the stroller 10. Alternatively, the center latch connector 108 can be configured to retract toward the shell 102 as the infant carrier 100 is lowered and then to automatically engage, hook onto, or extend under the central portion 44 as the connector clears the arm bar 20. Likewise, the side latch connectors 110 can also be configured to retract in the direction of the arrow R in FIG. 9 toward the shell 102 as the infant carrier 100 is lowered onto the stroller 10. The side latch connectors 110 can then fire into the receptacles 122 of the ICS mounts 120 when the connectors clear the tops 126 of the ICS mounts. In another alternative example, the user may be required to actuate the release actuator 106 to retract the latch connectors 108, 110 as the infant carrier is lowered in order to clear the arm bar 20 and ICS mounts, respectively. The actuator 106 can then be released to allow the connectors 108, 110 to engage. The latch connectors 108, 110 can be biased outward from the shell by biasing elements that are overcome by actuating the release handle or by simply lowing the infant carrier onto the stroller.

The arm bar 20 is described herein as being connected to each of the frame sides, L and R, as will become apparent below. However, as alluded to above, it may be possible that an accessory device may have only one side attached to only one frame side L or R or to some other part of the stroller while still extending toward or partially traversing toward the middle of the stroller to support an infant carrier. However, in the disclosed example, the accessory device, i.e., the arm bar 20, has an ICS mount carried near each of the free ends 46 on the body 42 of the device.

In the disclosed example, the ICS mounts protrude inward relative to the arms 48 on the arm bar 20. The ICS mounts can be integrated into the arms of the arm bar near the free ends, but can be vertically within the profile height of the arms, as in this example. However, in other examples, the ICS mounts can be placed in other arrangements relative to the arms on the arm bar or relative to other parts of the arm bar or accessory device. The ICS mounts can also be integrated into the arm and not protrude at all from any surface of the bar. The slot or receptacle of the ICS mounts in each example can again be surrounded on three sides, as in this example. However, the slot or receptacle shape, construction, and configuration can vary as needed to accommodate a particular infant carrier design.

The arm bar 20 in this example also has latch elements or mechanisms 68 for securing the arm bar to the stroller. Again, the latch element features and components of the arm bar 20 can also vary in configuration and construction from the disclosed example. Two or more of the latch elements can be provided on the accessory device and can be actuated by a single actuator. The latch elements can differ from the toggle levers 70 described in this example.

In the disclosed example, the receivers 56 are configured to mate with and engage the side latch connectors 110 on the arms 48 on the arm bar 20. These features and components can also vary in shape, configuration, and construction from the disclosed example. The arm bar can be configured to slide and snap into place, snap into place, drop and snap into place, or the like. The various connectors and surfaces can be ramped or otherwise configured to permit ease of installation and automatic retraction and firing of the various latch elements and latch connectors.

The disclosed ICS mounts can mirror prior art configurations carried on the stroller frame, but instead be integrated onto the arm bar or accessory device. Alternatively, the disclosed ICS mounts and the latch elements and latch connectors can be altered and improved from prior art configurations and still function as intended. The disclosed ICS mounts can also be integrated onto a child tray instead of an arm bar, if desired. The child tray would then be removable from and attachable to the stroller in a manner similar to that described and shown herein for the arm bar with integrated ICS mounts. Providing the ICS mounts on a removable accessory device instead of as a fixed part on the stroller or frame significantly reduces the likelihood that a user will improperly install an infant carrier on a stroller.

Without the accessory device attached, as disclosed herein, there are no mounting points on the stroller to which a user can attach or partially attach or install an infant carrier.

Although certain ICS, stroller, travel system, and accessory device features, components, structures, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. An accessory device for a stroller, the accessory device comprising:
   a body comprising:
      a central portion;
      a first arm extending from the central portion and comprising a first free end, a first inward facing side, and an opposing first outward facing side; and
      a second arm extending from the central portion and comprising a second free end, a second inward facing side, and an opposing second outward facing side, wherein the first inward facing side faces the second inward facing side;
   wherein the central portion is between the first arm and the second arm;
   an infant car seat mount disposed along at least one of the first inward facing side and the second inward facing side; and
   a latch element configured to selectively attach the accessory device to a frame assembly of the stroller along at least one of the first outward facing side and the second outward facing side;
   wherein the accessory device is configured to widthwise traverse the frame assembly of the stroller when attached to the frame assembly, the accessory device being selectively removable from and attachable to the frame assembly.

2. The accessory device of claim 1, wherein the accessory device is an arm bar.

3. The accessory device of claim 1, wherein the accessory device is a child tray.

4. The accessory device of claim 1, wherein the latch element is disposed near at least one of the first free end and the second free end.

5. The accessory device of claim 1, wherein the latch element is positioned near the first free end and configured to selectively attach the accessory device to the frame assembly along the first outward facing side and wherein the accessory device further comprises a second latch element positioned near the second free end, the latch element and the second latch element configured to selectively engage with or disengage from the frame assembly.

6. The accessory device of claim 1, wherein the infant car seat mount is positioned along the first arm near the first free end and wherein the accessory device further comprises a second infant seat car mount positioned on the second arm near the second free end.

7. A stroller comprising:
   a frame assembly; and
   an accessory device selectively removable from and attachable to the frame assembly, the accessory device having a body comprising:
      a central portion;
      a first arm extending from the central portion and comprising a first free end, a first inward facing side, and an opposing first outward facing side; and
      a second arm extending from the central portion and comprising a second free end, a second inward facing side, and an opposing second outward facing side, wherein the first inward facing side faces the second inward facing side;
   an infant car seat mount disposed along the first inward facing side; and
   a latch element configured to selectively attach the accessory device to the frame assembly along the first outward facing side.

8. The stroller of claim 7, wherein the accessory device is an arm bar.

9. The stroller of claim 7, wherein the accessory device is a child tray.

10. The stroller of claim 7, wherein the latch element is disposed along the first arm near the first free end, the latch element configured to selectively engage with or disengage from a part of the frame assembly of the stroller.

11. The stroller of claim 7, wherein the latch element is positioned along the first arm near the first free end and configured to selectively attach the accessory device to the frame assembly along the first outward facing side and wherein the accessory device further comprises a second latch element positioned along the second arm near the second free end, the latch element and the second latch element configured to selectively engage with or disengage from the frame assembly of the stroller.

12. The stroller of claim 10, wherein the latch element includes a toggle lever with a latch at a first end of the toggle lever and a push lever at a second end of the toggle lever opposite the latch, the latch being engaged with a latch receiver on the frame assembly when the accessory device is attached to the frame assembly, and the push lever being actuable to disengage the latch from the latch receiver permitting removal of the accessory device from the frame assembly.

13. The stroller of claim 7, wherein the infant car seat mount comprises a receptacle in the first arm, the receptacle comprising an opening along a bottom side of the first arm.

14. The stroller of claim 7,
   wherein the frame assembly has spaced apart frame sides, and
   wherein the infant car seat mount is positioned along the first arm near the first free end and wherein the accessory device further comprises a second infant seat car mount positioned on the second arm near the second free end wherein the first free end is disposed adjacent to one of the spaced apart frame sides and wherein the second free end is disposed adjacent to another of the spaced apart frame sides when the accessory device is coupled to the frame assembly.

15. A travel system comprising:
   a stroller comprising a frame assembly with left and right frame sides;
   an infant carrier comprising a seat shell, a release handle, and a plurality of latch connectors exposed beyond the seat shell and operable by the release handle; and
   an accessory device comprising:
      a central portion;
      a first arm extending from the central portion and comprising a first free end, a first inward facing side, an opposing first outward facing side, a first infant car seat mount disposed along the first inward facing side, and a first latch element configured to selectively attach the accessory device to the frame assembly along the first outward facing side; and
      a second arm extending from the central portion and comprising a second free end, a second inward facing side, an opposing second outward facing side, a second infant car seat mount disposed along the second inward facing side, and a second latch element configured to selectively attach the accessory device to the frame assembly along the second outward facing side, wherein the first inward facing side faces the second inward facing side;

wherein the first and second latch elements respectively engage with parts on the left and right frame sides when the accessory device is attached to the stroller, wherein, when the accessory device is attached to the stroller and the infant carrier is installed on the stroller, a portion of the shell rests on the accessory device, a first one of the plurality of latch connectors engages the first infant car seat mount and the second one of the plurality of latch connectors engages the second infant car seat mount, and wherein, when the infant carrier is removed from the stroller, the accessory device is removable from the stroller by actuating the first and the second latch elements.

16. The accessory device of claim 1, wherein the latch element includes a toggle lever with a latch at a first end of the toggle lever and a push lever at a second end of the toggle lever opposite the latch.

17. The accessory device of claim 16, wherein the latch is configured to engage a latch receiver on the frame assembly when the accessory device is attached to the frame assembly.

18. The accessory device of claim 17, wherein the push lever is actuable to disengage the latch from the latch receiver.

* * * * *